US012572618B2

(12) United States Patent
Thouppuarachchi et al.

(10) Patent No.: US 12,572,618 B2
(45) Date of Patent: *Mar. 10, 2026

(54) POINT PROCESSOR ARRAY FOR SOLVING PARTIAL DIFFERENTIAL EQUATIONS

(71) Applicant: Vorticity Inc., Redwood City, CA (US)

(72) Inventors: Chirath Neranjena Thouppuarachchi, Redwood City, CA (US); Ross Geoffrey Daly, San Francisco, CA (US)

(73) Assignee: Vorticity Inc., Redwood City, CA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 17/576,753

(22) Filed: Jan. 14, 2022

(65) Prior Publication Data

US 2022/0229879 A1    Jul. 21, 2022

Related U.S. Application Data

(60) Provisional application No. 63/137,924, filed on Jan. 15, 2021.

(51) Int. Cl.
G06F 17/13 (2006.01)
(52) U.S. Cl.
CPC .................................... G06F 17/13 (2013.01)
(58) Field of Classification Search
CPC ...... G06F 17/13; G06F 9/5066; G06F 9/5072; G06F 30/34; G06F 30/337; G06F 7/57; G06F 7/575
See application file for complete search history.

(56) References Cited

U.S. PATENT DOCUMENTS

| | | | | |
|---|---|---|---|---|
| 11,163,715 B1* | 11/2021 | Luijten | .................. | G06F 17/13 |
| 2011/0196907 A1* | 8/2011 | Kusmanoff | ............. | G06F 17/13 |
| | | | | 708/446 |
| 2014/0137124 A1* | 5/2014 | Szalay | .................. | G06F 9/5072 |
| | | | | 718/102 |
| 2020/0074295 A1* | 3/2020 | O'Donncha | ........ | G06F 18/2413 |

FOREIGN PATENT DOCUMENTS

JP          H0887475 A   *   4/1996

* cited by examiner

*Primary Examiner* — Emily E Larocque
(74) *Attorney, Agent, or Firm* — Fenwick & West LLP

(57) ABSTRACT

Embodiments relate to a system for solving partial differential equations. The system receives problem packages corresponding to problems to be solved, each comprising at least a partial differential equation and a domain. A solver stores a plurality of nodes of the domain corresponding to a first time-step, and processes the nodes over a plurality of time-steps using an array of point processors. Each point processor comprises a series of tiles, each having a computational element and a router, and are configured and connected based on a discretized form of the partial differential equation, to allow each point processor to receive a node of the domain and generate a value for the node for a next time step. Because all the data and computational requirements of the point processors are determined at compile time, no dynamic scheduling needs to be performed, allowing for more efficient usage of computational resources.

20 Claims, 14 Drawing Sheets

|  | T=0 | T=1 | T=2 | T=3 | T=4 | T=5 | T=6 |
|---|---|---|---|---|---|---|---|
| ALU A | A0 | A1 | A2 | A3 | A4 | A5 | A6 |
| ALU B |  | B0 | B1 | B2 | B3 | B4 | B5 |
| ALU C |  |  | C0 | C1 | C2 | C3 | C4 |
| ALU D |  |  |  | D0 | D1 | D2 | D3 |

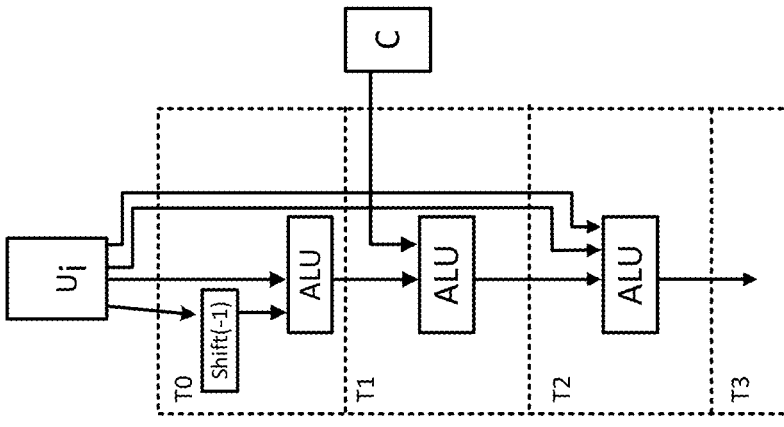
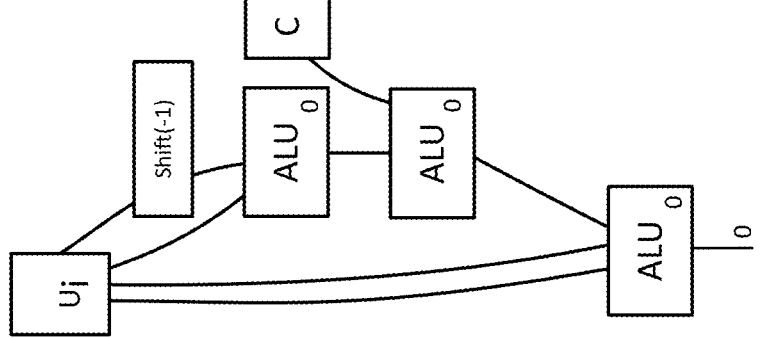
FIG. 11

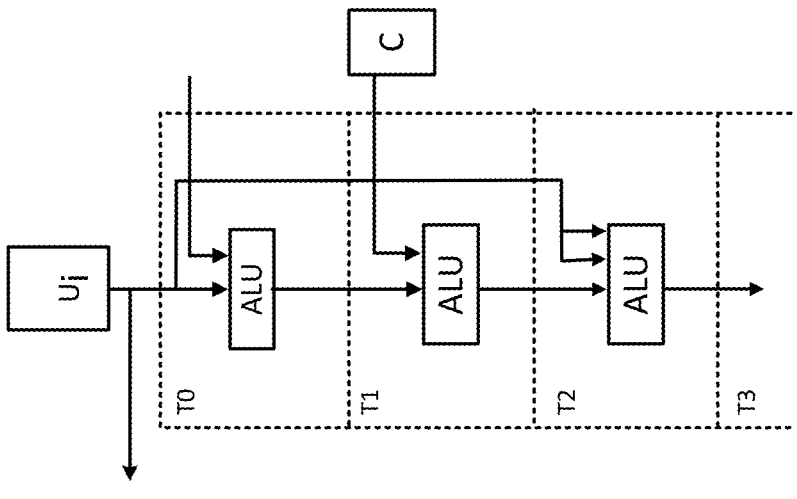
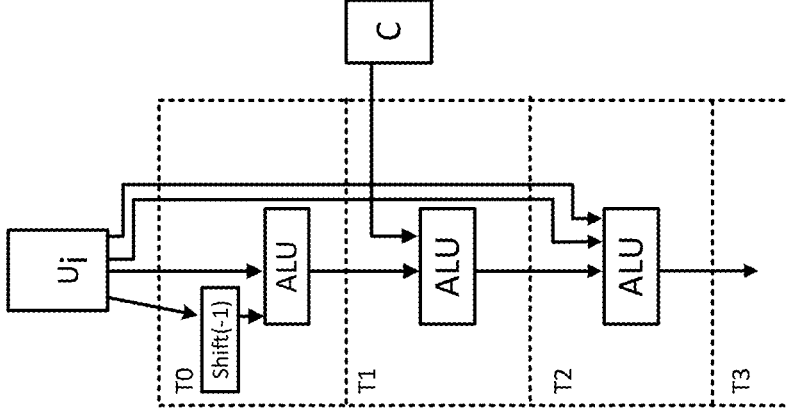
FIG. 12

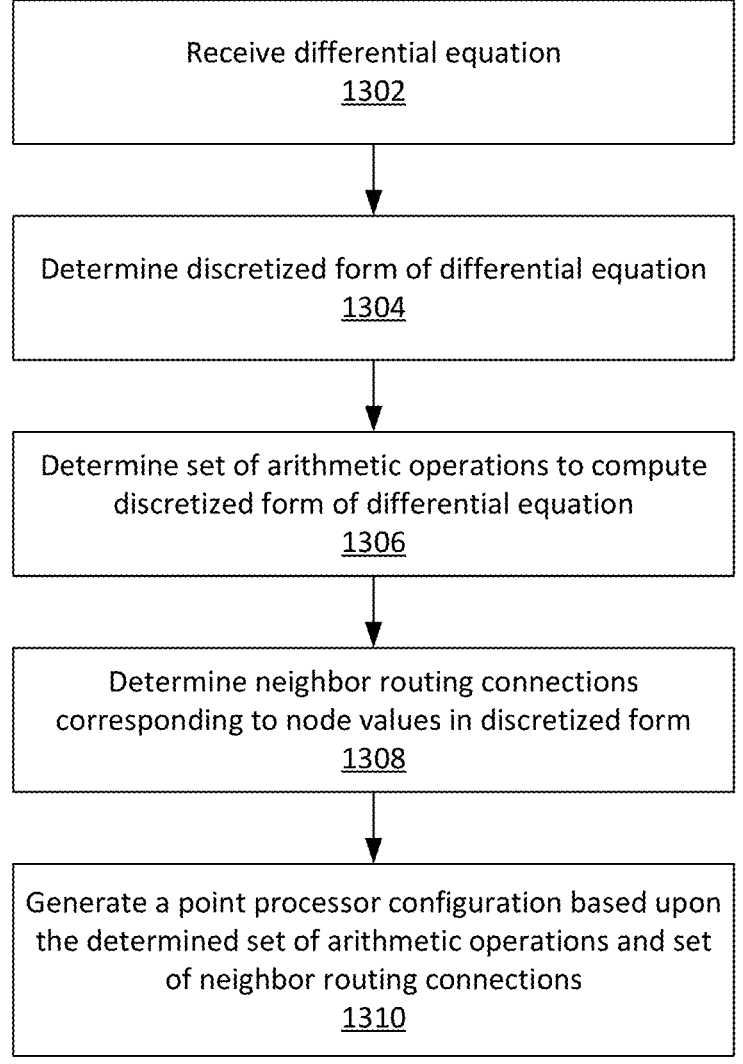

Receive differential equation
1302

Determine discretized form of differential equation
1304

Determine set of arithmetic operations to compute
discretized form of differential equation
1306

Determine neighbor routing connections
corresponding to node values in discretized form
1308

Generate a point processor configuration based upon
the determined set of arithmetic operations and set
of neighbor routing connections
1310

FIG. 13

POINT PROCESSOR ARRAY FOR SOLVING PARTIAL DIFFERENTIAL EQUATIONS

CROSS-REFERENCE TO RELATED APPLICATION

This application claims the benefit of U.S. Provisional Application No. 63/137,924, filed on Jan. 15, 2021, which is hereby incorporated by reference in its entirety.

BACKGROUND

The present disclosure generally relates to dedicated hardware systems for solving partial differential equations.

Partial differential equations are ubiquitous in describing fundamental laws of nature, human interactions and many other phenomena. Applications include fluid dynamics, molecular dynamics, electronic structure, high frequency options trading, brain tissue simulations, satellite orbitals, nuclear explosion simulations, black hole simulations, etc.

Solving partial differential equations has been a major use of computers since their advent in the mid-1900s. Today, estimates show that over 50% of high performance computing is diverted towards solving partial differential equations, from supercomputers at national labs to small computer clusters in medium size companies. As such, a need exists for computers that can more efficiently solve partial differential equations.

BRIEF DESCRIPTION OF THE DRAWINGS

FIG. 11 is a diagram showing how the compiler maps the instructions shown in FIG. 10 to tiles of a point processor, in accordance with some embodiments.

FIG. 12 is a diagram showing how the compiler performs routing between point processors of the computational array, in accordance with some embodiments.

FIG. 13 is a flowchart of a process for generating a point processor configuration for solving a partial differential equation problem package, in accordance with some embodiments.

Figure 1:
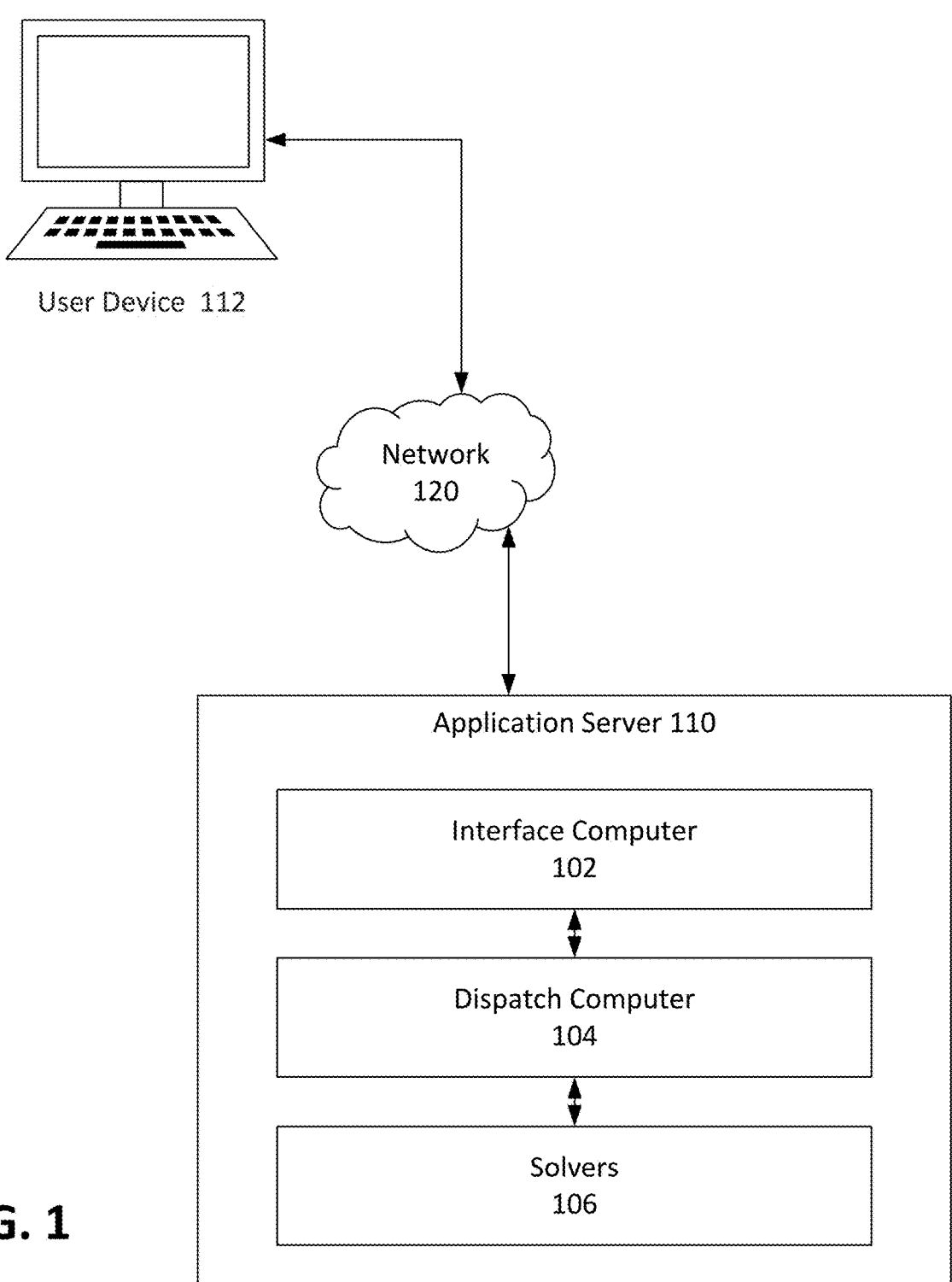
FIG. 1 illustrates a high level diagram of a system for solving partial differential equations, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments herein are directed to a purpose built computing architecture to enable fast solving of partial differential equations within large domains with complicated boundary conditions. Partial differential equations are ubiquitous in describing fundamental laws of nature, human interactions, and many other phenomena. Applications of partial differential equations include fluid dynamics, molecular dynamics, electronic structure, high frequency options trading, brain tissue simulations, satellite orbitals, nuclear explosion simulations, black hole simulations, etc.

While simple partial differential equations can be solved with analytical solutions, many more complicated partial differential equations must be solved numerically in order to obtain useful results. This usually involves breaking up a problem domain into many slices/nodes/particles etc., and solving a discretized form of the equation on each slice/node/particle. This can be a tedious process. In addition, as domain size and accuracy requirements increase (e.g., resolution of the solution, maximum partition size possible, etc.), the number of calculations needed to be performed can increase dramatically.

The usage of current computer systems (e.g., general-purpose computers) has several problems. In many applications, each particle or node in the domain of the partial differential equation to be solved requires perhaps $\sim 10^2$-$10^3$ floating point operations to calculate the next time step. Since these operations have to be done sequentially, the best time scaling that the simulation or solution can achieve is described in Equation (1) below, even without accounting for the clock cycles needed in a von Neumann architecture to fetch instructions, decode, access memory multiple times to perform a single operation.

$$\frac{\text{computer clock speed}[s-1]}{\text{operations per node}[\text{timestep}-1] \times \text{number of nodes in domain}} \text{timesteps/second} \quad (1)$$

For problems that require "strong vertical scaling" such as molecular dynamics, this ceiling is a major problem where even the best supercomputers can only muster several microseconds of simulation time for several days' worth of compute time.

When possible, for large domain sizes, parallel computing can be used to speed up the solution. However the need to pass large amounts of data between the parallel computing units in such a setup slows down the time to solution. For example, when engineers use 1000 cores, the speed up is no more than 10 times as fast as using a single core. This problem is generally referred to as Amdahl's law, where the speed up in latency of the execution of tasks from using additional parallel processors levels off even as additional parallel processors are added, due to the speedup being limited by the serial portion of the program.

In some applications, a problem may consist of both a small time scale and a very large domain size. An example of this is direct numerical simulations of the Navier Stokes equation. Typically, these types of problems are never solved except on rare occasions on national super computers despite the unprecedented accuracy.

In addition, in cases where the solution at a particular time interval needs to be recorded, then in most cases the computation will stop to download this timestep information, further adding to the time to solution for a given problem.

System Overview

Embodiments are directed to a computer architecture specialized to solve partial differential equations that addresses the problems expounded above. In some embodiments, a system for solving partial differential equations is configured to receive problem packages corresponding to problems to be solved, each comprising at least a partial differential equation and a domain. A solver stores a plurality of nodes of the domain corresponding to a first time-step, and processes the nodes over a plurality of time-steps using an array of point processors. Each point processor comprises a series of tiles, each having a computational element (e.g., an ALU) and a router. The tiles of each point processor are configured and connected based on a discretized form of the partial differential equation, to allow each point processor to receive a node of the domain and generate a value for the node for a next time step. Because all the data and computational requirements of the point processors are determined at compile time, the point processors do not need to perform any dynamic scheduling, allowing for a greater proportion of on-chip area to be allocated towards useful computation.

FIG. 1 illustrates a high level diagram of a system for solving partial differential equations, in accordance with some embodiments. The system comprises an interface computer 102, a dispatch computer 104, and a plurality of solver units 106. In some embodiments, the interface computer 102, dispatch computer 104, and solver units 106 are implemented on an application server 110. While FIG. 1 illustrates a single application server 110, it is understood that in other embodiments, the interface computer 102, dispatch computer 104, and solvers 106 may be implemented on multiple servers or devices, on a cloud server, etc.

In some embodiments, the user accesses the application server 110 from a user device 112, such as a PC, laptop, workstation, mobile device, etc. The user device 112 may access the application server 110 through a network 120 (e.g., the Internet). In other embodiments, the user device 112 may connect to the application server 110 via a direct line connection (e.g., a direct line connection to the interface computer 102). In addition, although FIG. 1 only shows a single user device 112 connecting to the application server 110, it is understood that in some embodiments, many user devices may concurrently connect to the application server 110 (e.g., via the network 220).

The user at the user device 112 may transmit to the application server 110 (e.g., through the network 120) one or more problems involving partial differential equations to be solved. In some embodiments, the user device 112 transmits each problem in the form of a problem package, comprising at least a partial differential equation associated with the problem, and a domain. In some embodiments, the problem package further comprises a mesh (or particle domain) for the problem, one or more boundary conditions, initial conditions, flow conditions (such as density and viscosity), a solve type (e.g., 3D incompressible DNS Navier Stokes), and/or the like. The problem package may be sent to the interface computer 102 over the secured internet using a provided API of the interface computer 102.

The interface computer 102 receives the problem package, which is processed by the dispatch computer 104 and dispatched to the solvers 106. The solvers 106 generate a solutions package comprising a solved domain that is transmitted back to the user device 112. The solutions package may further comprise one or more averages, one or more solver metrics, one or more errors messages, etc.

Figure 2:
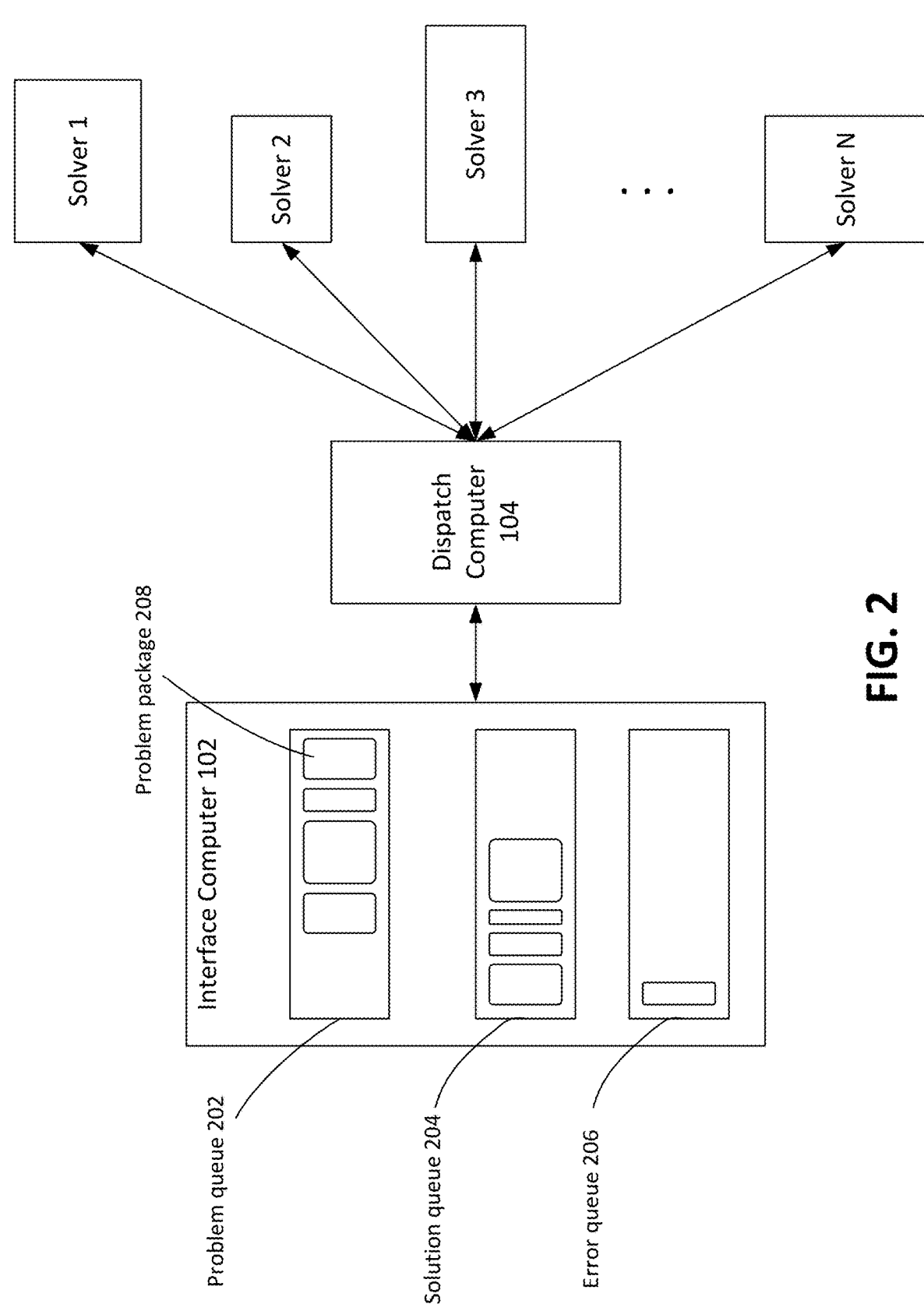
FIG. 2 illustrates a diagram of the interface computer, dispatch computer, and solver units, in accordance with some embodiments.

FIG. 2 illustrates a diagram of the interface computer 102, dispatch computer 104, and solver units 106, in accordance with some embodiments. The interface computer 102 is networked to both the user (e.g., the user device 112) and the dispatch computer 104. The interface computer 102 comprises a problem queue 202, a solution queue 204, and an error queue 206. The interface computer 102 is configured to accept incoming problems to be solved by various interested parties (e.g., problem packages from one or more users at user devices 112), and add the received problem packages 208 to the problem queue 202. In some embodiments, the interface computer 102 may first check the received problem package for accuracy. For example, the interface computer 102 may, if the problem package specifies a time step size and is associated with certain types of partial differential equations, that the specified time step conforms with the Courant-Friedrichs-Lewy (CFL) convergence condition. In cases where the problem package specifies an unstructured mesh, the interface computer 102 may check if the specified mesh is well-formed. In some embodiments, the interface computer 102 may receive a problem package that comprises geometry information with initial and boundary conditions instead of a mesh, whereupon the interface computer may generate a mesh for the problem based upon the received geometry information and conditions.

The interface computer 102 sends problem packages 208 to the dispatch computer 104 to be solved by one or more of the plurality of solvers 106. In some embodiments, each problem package within the problem queue 202 may be assigned a priority level. The priority level for a problem package 202 may be based upon a provided indication within the problem package, the user from which the problem package was received, one or more parameters of the problem package (e.g., type of partial differential equation, size of domain, etc.), size of the problem package, an amount of time the problem package has been in the problem queue 202, and/or any combination thereof.

The interface computer 102 is further configured to receive solution information from the dispatch computer 104. In some embodiments, the solution information is received in the form of one or more solution packages (e.g., as described above). In other embodiments, the interface computer 102 reformats the received solution information to form one or more solution packages. The interface computer 102 stores the one or more solution packages in the solution queue 204, and transmits the solution packages from the solution queue 204 to their respective users (e.g., to the user devices 112 responsible for sending the problem package corresponding to the solution package).

In some embodiments, the interface computer 102 receives error information from the dispatch computer 104, corresponding to any errors encountered by the solvers 106 when solving the problem. In some embodiments, the dispatch computer 102 checks the fidelity of the results of the received solution information, and generates one or more errors if any issues are found (e.g., pressure, density, velocity, etc. parameters not being bounded). The determined errors may be stored in the error queue 206, to be transmitted to corresponding users.

The dispatch computer 104 is networked to the interface computer 102 and to one or multiple solver units 106. The dispatch computer determines which solver 106 is the best to solve a given user problem at a given time. As illustrated in FIG. 2, the dispatch computer 104 may be in communication with a plurality of solvers 106 (e.g., solvers 106-1 through 106-*n*). In some embodiments, the dispatch computer 104 monitors an availability of the solvers 106 (e.g., a capacity of each solver to process additional problems) and the problem queue 202 of the interface computer 102, in order to determine which problem packages 208 should be processed by which of the solvers 106.

The solvers 106 are the workhorses of the system, and are configured to generate solutions to the various problems that come to the system. The solvers may be of different types. For example, each of the solvers 106 may be optimized for one or more specific applications, such as fluid dynamics, molecular dynamics, electronic structure, etc. In some embodiments, each solver 106 may also be optimized to solve domains of different sizes. The various sizes may help optimize the use of the hardware by allocating larger problems to the larger solvers and smaller problems to the smaller solvers.

Solver Structure

Figure 3:
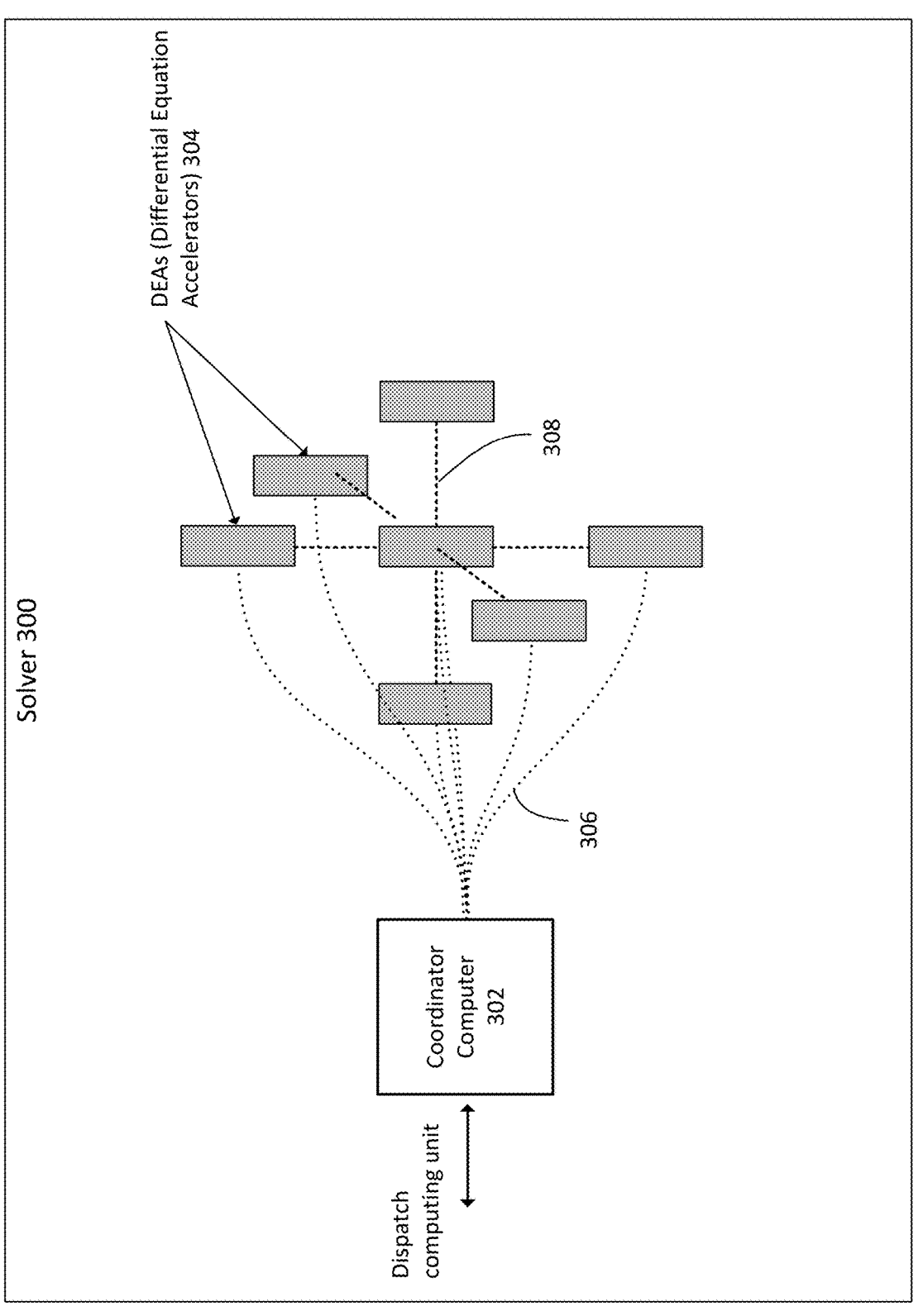
FIG. 3 is a diagram illustrating components of a solver, in accordance with some embodiments.

FIG. 3 is a diagram illustrating components of a solver, in accordance with some embodiments. The solver 300 illustrated in FIG. 3 may correspond to one of the solvers 106 illustrated in FIGS. 1 and 2. The solver 300 comprises a coordinator computer 302, multiple compute units (referred to as Differential Equation Accelerator (DEA) units, or DEAs) 304, one or more DEA—Coordinator interconnects 306, and one or more DEA—DEA interconnects 308.

The coordinator computer 302 (or coordinator 302) is connected to the dispatch computer (e.g., dispatch computer 104) on one side and to multiple DEAs 304 on the other. The coordinator 302 is responsible for coordinating the various aspects of the DEAs when solving a user problem. For example, the coordinator 302 may, in response to receiving a problem package, divide the domain of the problem into a plurality of subdomains, and assigns each subdomain to a respective DEA 304. The coordinator 302 may synchronize the DEAs 304 and initiates solving operations by the DEAs 304. The coordinator 302 further downloads results from each of the DEAs 304.

The solver 300 comprises a plurality of DEAs 304. Each DEA 304 is configured to receive a subdomain of a problem, and generate solution data for the received subdomain. The coordinator computer 302 and the DEAs 304 are connected via DEA—Coordinator interconnects 306 and DEA—DEA interconnects 308, allowing for the coordinator 302 to manage operations of the DEAs 304, and for the DEAs 304 to share stored domain information with each other (discussed in greater detail below).

The DEA-Coordinator interconnects 306 and DEA-DEA interconnects 308 may be implemented as cabling connecting the coordinator 302 to the DEAs 304, and the DEAs 304 to each other, respectively. In some embodiments the interconnects 306 and 308 may be implemented using PCI Express cables (e.g., PCIe v4.0). The number of interconnects between the DEAs 304 may be contingent on how the domain is sliced up across the DEAs in that solver, e.g., based on a partitioning scheme of the solver for partitioning received domains. For example, if the solver is configured to slice the domain up into pyramids, then the number of interconnects may be smaller compared to if it was sliced up into higher order polygons. In some embodiments, if the number of DEAs 304 is large, then it may be hard to physically connect all the DEAs 304 onto one coordinator 302. In such cases, relays (not shown) can be used to bunch up some of the cabling.

Figure 4:
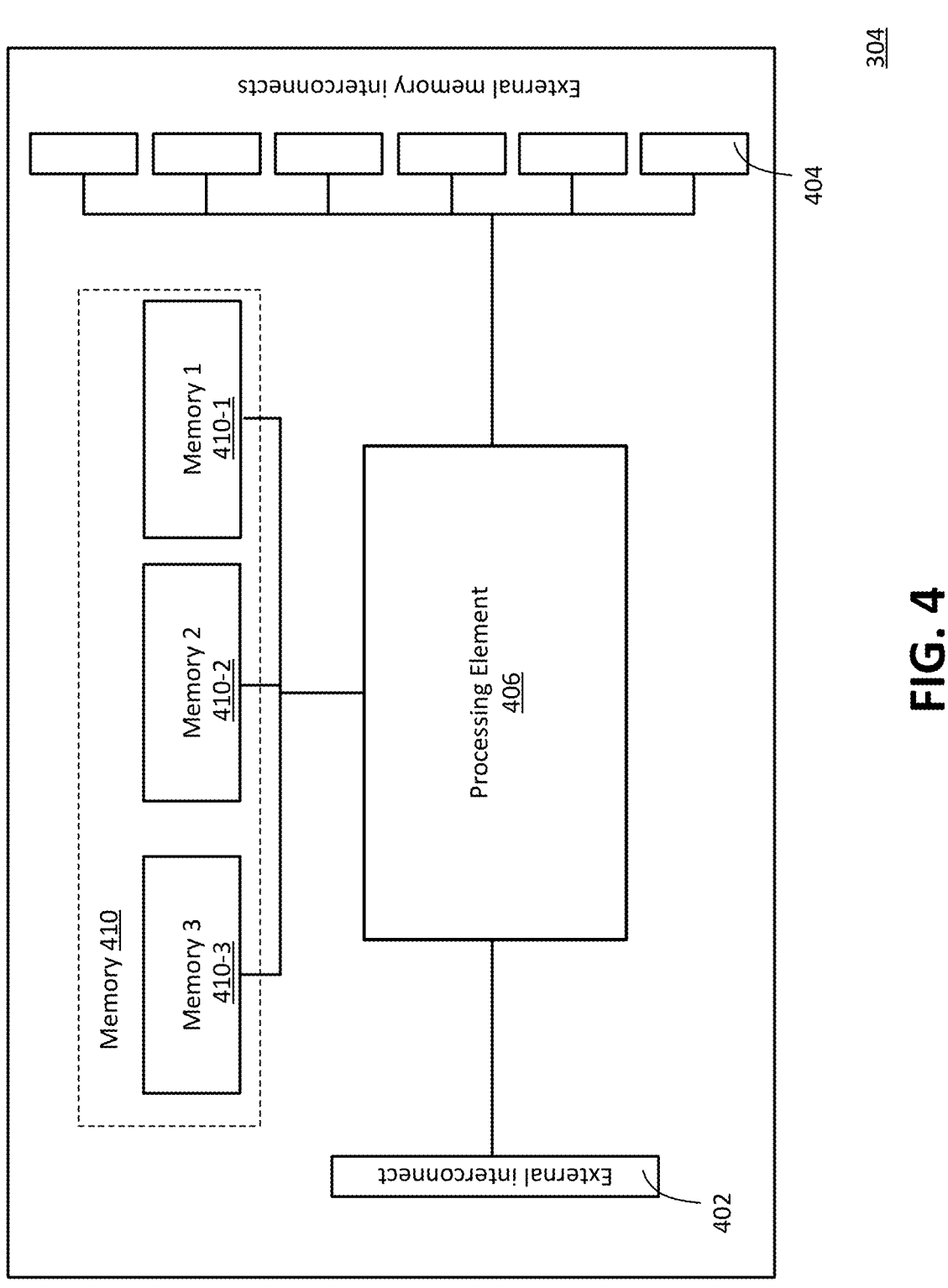
FIG. 4 illustrates a layout of a DEA, in accordance with some embodiments.

FIG. 4 illustrates a layout of a DEA 304, in accordance with some embodiments. The DEA 304 may include an external interconnect 402 that enables transmission of data and control signals going back and forth between the DEA 304 and the coordinator 302. For example, the DEA 304 may receive problem and subdomain data from the coordinator 302 via the external interconnect 402. The DEA 304 may also receive instructions from the coordinator 302 (e.g., synchronization instructions to synchronize with other DEAs of the solver, instructions to begin solving, etc.). In addition, the DEA may transmit generated solution information corresponding to the received problem and subdomain back to the coordinator through the external interconnect 402.

The external memory interconnects 404 comprises interconnect circuitry that manages data and control signals between the various DEA units. For example, in some embodiments, the DEA 304 may require information relating to other subdomains being processed by other DEAs of the solver. As such, the DEA 304 may receive additional subdomain data from other DEAs via the external memory interconnects 404.

The processing element 406 manages the overall functioning of the DEA unit. In some embodiments, the processing element 406 is a processor that processes received subdomain data, determines and stores parameters associated with the problem subdomain, and manages solving of the problem subdomain over a plurality of time-steps.

The memory 410 is used to store the problem to be solved. In some embodiments, the memory 410 of each DEA is divided into three subunits (e.g., first memory unit 410-1, second memory unit 410-2, and third memory unit 410-3). In some embodiments, the memory units 410-1 through 410-3 are implemented as part of the same memory. In other embodiments, the memory units 410-1 through 410-3 are implemented as two or more separate memory chips.

In some embodiments, first and second memory units 410-1 and 410-2 are used in general solving of the partial differential equation, while the third memory unit 410-3 may be used when the DEA 304 is to send data back to the coordinator (e.g., via the external interconnect 402).

Figure 5:
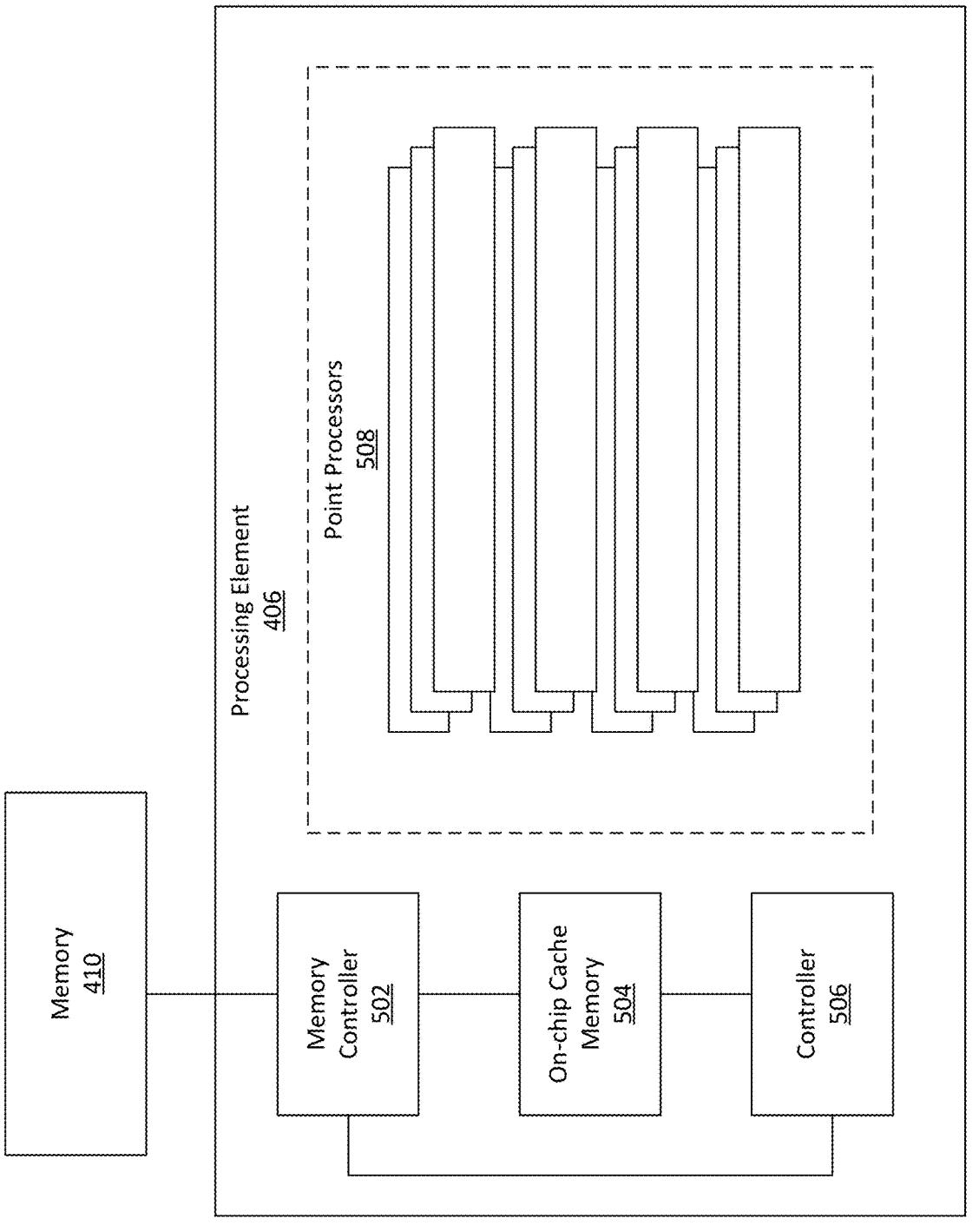
FIG. 5 illustrates a block diagram of the processing element of each DEA, in accordance with some embodiments.

FIG. 5 illustrates a block diagram of the processing element 406 of each DEA, in accordance with some embodiments. The processing element 406 comprises a memory controller 502, on-chip cache memory 504, a controller 506, and point processors 508. The processing element 406 is configured to receive problem data (e.g., from the memory units 410) and to solve the received problem data using the point processors 508.

The controller 506 is a circuit that controls the overall operation of the processing element 406. For example, in some embodiments, the controller 506 receives instructions for configuring the point processors 508, and interfaces with the memory controller 502 to control the flow of data between the memory units 410 and the point processors 508. The memory controller 502 interfaces with the memory units 410 to manage communication of data between the memory units 410 and the point processors.

In some embodiments, the internal memory controller 502 may receive instructions from the controller 506 to retrieve data between the first and second memory units 410-1 and 410-2 and the point processor 508, move processed data to the third memory unit 410-3 in preparation for transmission to the coordinator of the solver, and/or the like. In some embodiments, the memory controller 502 retrieves data corresponding to node data for a first time step from one of the first and second memory units 410-1 and 410-2 to be processed by the point processors 508, which generate node data for a subsequent time step, which is stored to the other of the first and second memory units 410-1 and 410-2. Although FIG. 5 illustrates the memory controller 502 and controller 506 as separate components, in some embodiments, these may be implemented as part of a single controller.

The on-chip memory cache 504 is a circuit that stores local variables used during the solving of partial differential equations. In some embodiments, the on-chip cache memory 504 is implemented as an SRAM. The stored local variables may include any type of variable expected to be highly used during solving of the problem assigned to the DEA that are not expected to change during the solving of the received partial differential equation problem, such as subdomain data, solve type, and one or more constants to be used during the solving of the subdomain (e.g., fluid density, viscosity, etc.).

Figure 6:
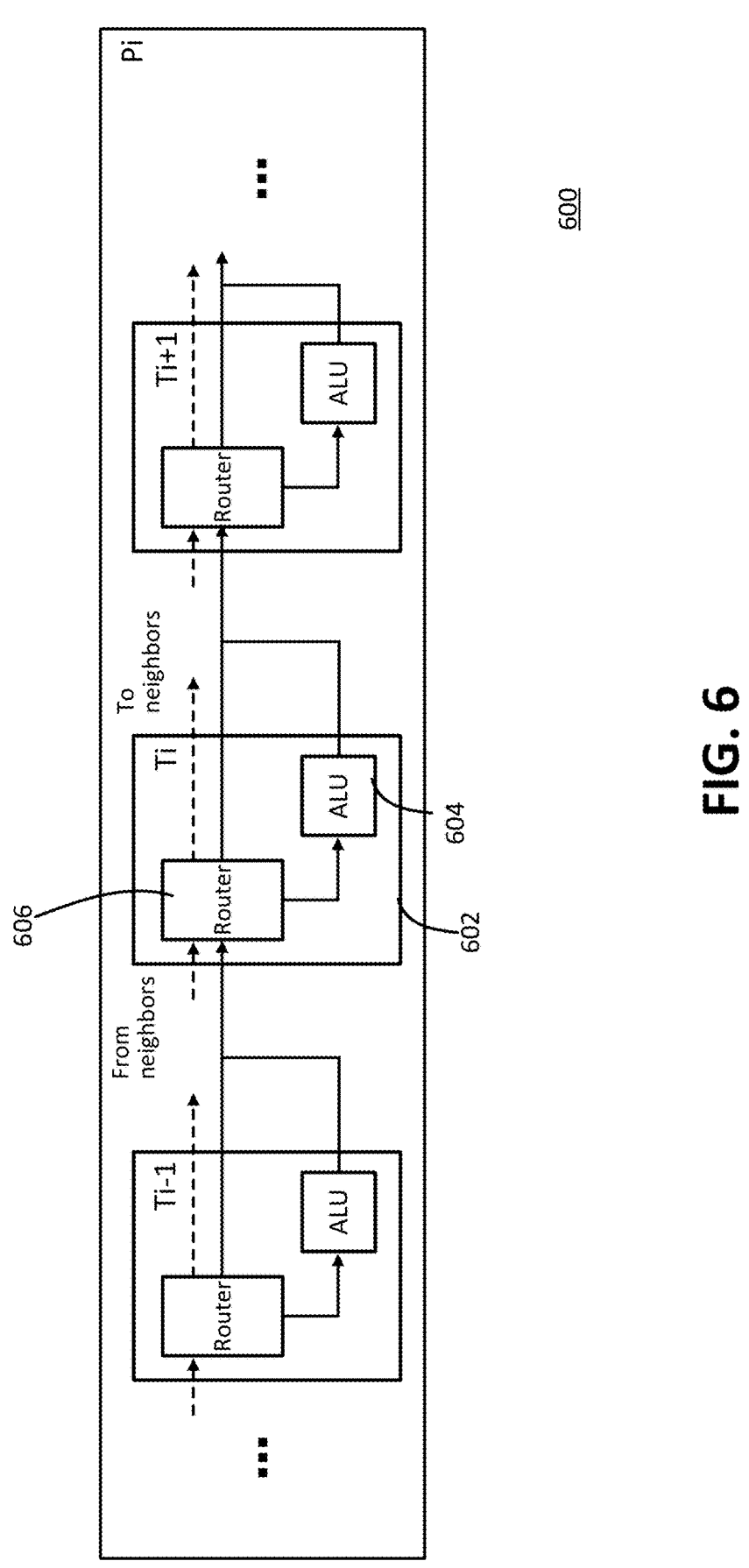
FIG. 6 illustrates a diagram of a point processor of the array of point processors, in accordance with some embodiments.

The processing element comprises an array of point processors 508 (hereinafter also referred to as a "PP" for short), e.g., a two dimensional A0×A1 array of point processors. FIG. 6 illustrates a diagram of a point processor of the array of point processors, in accordance with some embodiments. Each point processor 600 contains A2 tiles 602 connected serially, and is configured to, during solving, perform a full compute of a domain point. The entire A0×A1 array of point processors may thus contain a total of A0×A1×A2 tiles. Each tile 602 comprises a computational element, such as an ALU 604, and a router 606. In some embodiments, tile 602 may also include a storage element (e.g., a register file, not shown). The number of tiles 602 on a point processor (A2) can be defined based on the maximum depth of calculations required (for example, a multiphysics simulation such as magneto hydrodynamics may require up to a certain number of calculations, while problems associated with other types of partial differential equations may be associated with different number of calculations). When processing partial differential equations that involve fewer than A2 tiles, any excess tiles on the point processor will simply act as non-processing tiles with data passthrough.

In some embodiments, the router 606 of a tile 602 is configured to receive data (e.g., from the memory 504 or from another tile of a point processor of the point processor array, and route data to be processed by the ALU 604 and/or to be output by the tile 602. For example, in some embodiments, the router 606 of the tile 602 may receive a plurality of values, a route at least a first value of the plurality of values to be operated on by the ALU 604, and at least a second value to be output by the router 606 to a subsequent tile of the point processor array. In some embodiments, the output of the tile 602 may include an output of the ALU 604, a value passed by the router 606, or some combination thereof.

Figure 7:
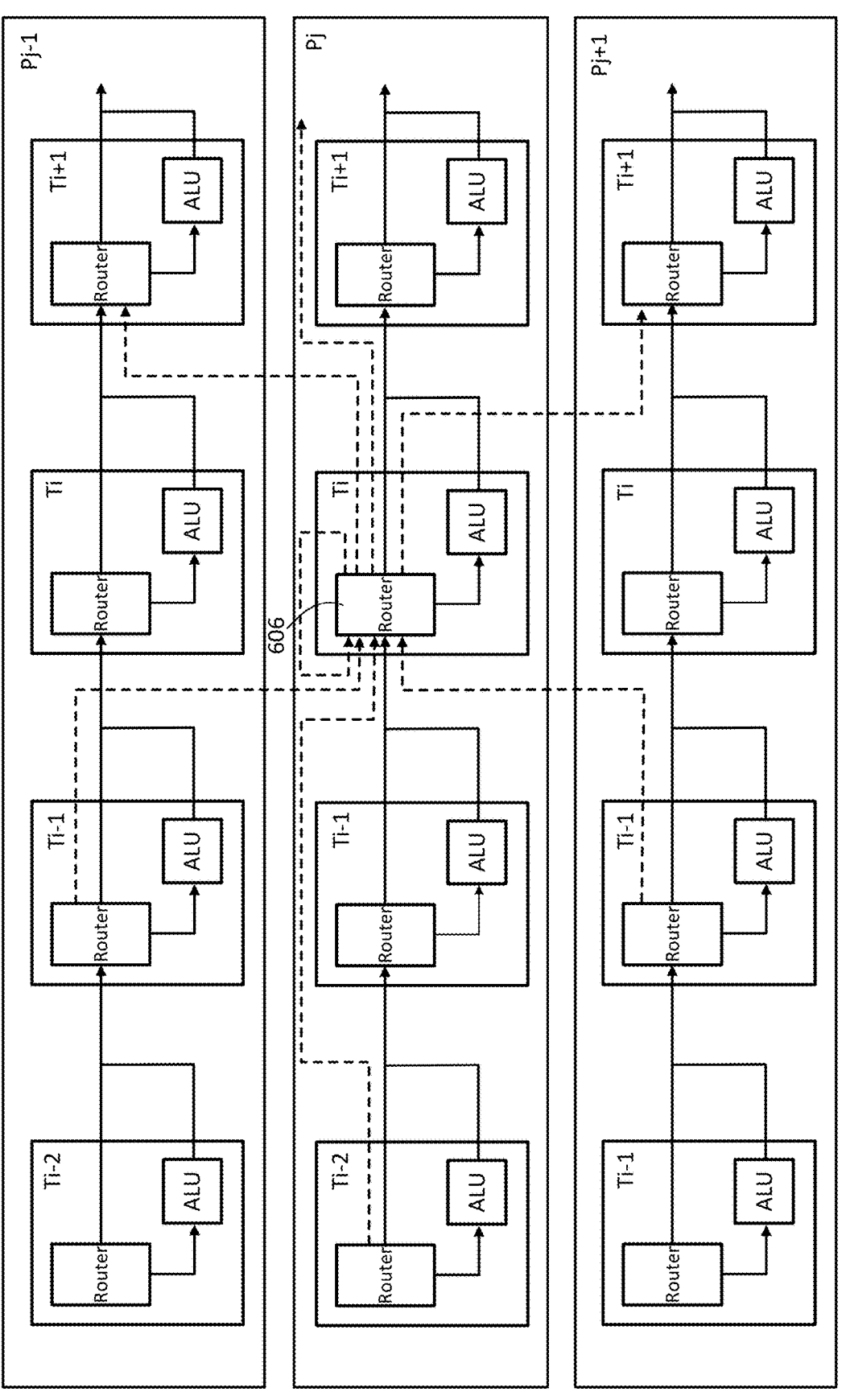
FIG. 7 illustrates a diagram showing a plurality of point processors in the A1 dimension of the array of point processors, in accordance with some embodiments.

FIG. 7 illustrates a diagram showing a plurality of point processors in the A1 dimension of the array of point processors, in accordance with some embodiments. In some embodiments, the router 606 of a tile is similar to a coarse grained reconfigurable architecture (CGRA) switchbox. The inputs to a router 606 of a particular tile can be from the following sources: (1) output from a previous tile of the point processor (e.g., from the previous tile's ALU and/or router), (2) global constants (e.g., stored in a register file located in the router, which may be populated at assembly), and (3) values from one or more local neighboring tiles of the same PP or a neighboring PP. For example, as illustrated in FIG. 7, the router of the tile $T_i$ of the point processor $P_j$ may, in addition to being connected to the router and/or ALU of the previous tile $T_{i-1}$, may receive data from tiles of neighboring point processors (e.g., tiles $T_{i-1}$ of neighboring point processors $P_{j-1}$ and $P_{j+1}$ in the A1 dimension) corresponding to data of different nodes in an A1 spatial dimension, as well as tiles within the same point processor $P_j$ (e.g., an output from another tile $T_{i-2}$, an output of its own router, and/or an output of its ALU) corresponding to data of different nodes in an A2 time dimension. For example, in some embodiments, the router of a tile may route certain inputs back on itself in cases where a calculation requires the same previous value.

In addition, the output of a particular tile (corresponding to an output of the tile's router and/or ALU) may be routed to (1) a subsequent tile of the point processor (e.g., tile $T_{i+1}$ of the point processor $P_j$), and/or to (2) neighboring tiles of the same PP or a neighboring PP (e.g., tile $T_{i+2}$ of the point processor $P_j$, or tiles $T_{i+1}$ of a neighboring PP along the A0 or A1 dimension).

Although FIG. 7, for the purpose of clarity, illustrates only one dimension of the point processors, in some embodiments, the point processors 508 are arranged in two dimensions. This means that instead of local connections within the same plane, there are additional connections to the tiles in the other planes (A0 dimension). For instance in the case of a first order PDE solve, each tile $T_i$, in addition to being connected to a preceding tile of the same point processor (e.g., tile $T_{i-1}$ of the same point processor), would have 2 local connections in each of the A1 and A2 dimensions as shown in FIG. 7 (e.g., corresponding to tiles $T_{i-1}$ of neighboring point processors in the A1 dimension, and tiles $T_{i-2}$ and $T_i$ in the A2 dimension), plus an additional 2 connections from the A0 dimension for a total of 6 (e.g., tiles $T_{i+1}$ of neighboring point processors in A0 dimension).

In some embodiments, each tile of a point processor is coupled to tiles of adjacent point processors of the point processor array, allowing the ALU of the tile to utilize data from neighboring nodes in the domain when processing received data. In cases where the ALU of a tile requires data from nodes that are further away in the domain (e.g., 2 or more point processors away), the node data is routed through successive point processors of the array to reach the tile, where the routing is pre-scheduled by the compiler. In some embodiments, the data dependencies of a tile of a point processor for a particular problem/PDE may be referred to as a "stencil" for the problem/PDE.

In some embodiments, in addition to the local connections (e.g., as shown in FIG. 7), there may be one or more constant inputs from the tile's instruction. The router can contain a limited number of registers so that it does not need to pipeline all of the inputs or all of the outputs.

In some embodiments, the ALUs of the tiles may be pipelined to increase maximum clock frequency. This may be used in large fused-multiply-add operations which is a core part of finite difference calculations. For an ALU that is pipelined in P stages, the output of the tile i ALU is not routed to tile i+1, but is instead routed to tile i+P (where P >1). In some embodiments, each of the first P tiles of the point processor may receive input data in parallel, and route their respective output data to a next P tiles of the point processors. In some embodiments, additional routing connections between the tiles of the point processors may be implemented to allow for more efficient pipelining when P exceeds a threshold amount.

For ease of discussion, the following discussion will be primarily in the context of a partial differential equation problem having a domain that is a structured regular mesh, although it is understood that the design will also work as specified for an unstructured mesh. In such a case, spatial coordinates of the points and the connectivity information of the domain may be encoded with the domain data. Each datapoint of the domain data may have one or more values. For example, when solving the Euler equation, each datapoint is associated with five variable values (e.g., conservation of mass, momentum in each of three dimensions, and energy).

For example, the domain may have:

a spatial domain size of $S_0$, $S_1$, $S_2$, resulting in a total number of points in the 3d domain being $S_0 \times S_1 \times S_2$ each datapoint having k values the number of computations per value per timestep update (computational intensity) is $C_i$ the total number of timesteps is t, and stencil dimensions $n_0$, $n_1$, $n_2$.

Accordingly, the computational requirements are $S_0 \times S_1 \times S_2 \times k \times C_i$ total operations (which may be floating point, fixed point or custom type operations). For example, a real-world problem package may have parameters $S_0 = S_1 = S_2 = 1000$, k=6, $C_i$=1000, t=106. To solve this problem it would take roughly 1 Exo floating point operations ($10^{18}$). It is useful to view the computational requirements as a 5-dimensional "computational space" ($S_0$, $S_1$, $S_2$, k, $C_i$) corresponding to 3 spatial dimensions and 2 computational dimensions.

In some embodiments, each point processor functions as a 2D computational slice in the form of a computational direct acyclic graph (DAG) with k primary input/output pairs, and an average DAG height of $C_i$. Data dependencies in ($S_0$, $S_1$, $S_2$, k, $C_i$) are contained within a local bounded 3D spatial neighborhood ($n_0$, $n_1$, $n_2$) and according to the dependency DAG of the 2 computational dimensions. To facilitate these data dependencies, the point processors are architected as a 3 dimensional set of ALUs with local neighboring connections in each dimension between ALUs resulting in a hyper-rectangular mesh of ALUs. In some embodiments, the array of point processors may be referred to as a computational array.

Figure 8:
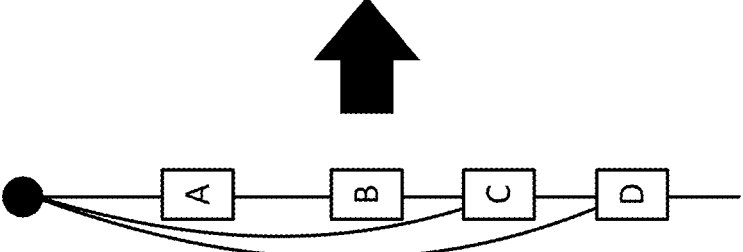
FIG. 8 illustrates a diagram showing an example of how data may flow through a point processor, in accordance with some embodiments.

FIG. 8 illustrates a diagram showing an example of how data may flow through a point processor of the computational array, in accordance with some embodiments. FIG. 8 illustrates a point processor having a plurality of tiles (tiles A, B, C, D comprising ALUs A, B, C, D, respectively) each configured to perform a respective computation (computations A, B, C, D, etc.) on received data. During solving, the point processor receives data for a plurality of nodes (e.g., nodes 0, 1, 2, 3, etc.) over consecutive cycles corresponding to T=0, 1, 2, 3, etc. For example, at time T=0, the tile/ALU A performs computation A on the data of node 0. At time T=1, the tile/ALU B performs computation B on the data of node 0 (as received from the tile/ALU A), while tile/ALU A performs computation A on data of the next node (node 1). At each subsequent time cycle, each tile/ALU performs the same computation on data of a next node of the domain that is assigned to the point processor (e.g., in embodiments where the domain is divided into two-dimension slices of nodes corresponding to the two-dimensional array of point processors, the next node may correspond to a corresponding node of the next slice of the domain). For example, for a particular point processor configuration, tile/ALU A always performs computation A on successive nodes 0, 1, 2, 3, etc., while tile/ALU B always performs computation B on successive nodes one time step behind tile/ALU0. In this manner, node data is passed through the tiles of each point processor, to generate a next value for the node (e.g., for a next timestep) at a last tile of the point processor. As shown in FIG. 8, a tile, in addition to receiving results data output by a previous tile of the processor, may also receive the original node data and/or node data corresponding to other points in the computation for use in computation (e.g., passed via registers on the routers of the point processor tiles). For example, during time T=2, tile C performs computation C on data received from tile B (corresponding to node 0) and the original data for the node. In some embodiments, the additional data (e.g., original node data) is routed through one or more preceding tiles of the point processor (e.g., through the routers of tiles A and/or B without being processed by their respective ALUs) until it is received by the tiles at which it is used for further computation (e.g., at tiles C and D). In addition, each tile may further receive data from other point processors of the computational array (not shown in FIG. 8) for performing its computations.

In some embodiments, scheduling is performed at compile-time and can be split into two problems: (1) scheduling the streaming of the 4D ($S_0$, $S_1$, $S_2$, k) data from off chip into the local memory on-chip memory every cycle, and (2) scheduling computation on the computational array every cycle.

In some embodiments, the goal for scheduling the streaming of off-chip data (e.g., from the memory 410) onto the local on-chip memory is to find a schedule for streaming all ($S_0 * S_1 * S_2 * k$) pieces of data on to the chip assuming a Memory Bandwidth of Bicycle (where B<<each of $S_0$, $S_1$, $S_2$). In some embodiments, B may be based upon the dimensions of the point processor array A0×A1. In some embodiments, the design is configured such that there is $n_0$ re-streaming of the same data, and on-chip caching is minimized by using any cached data as soon as possible. In some embodiments, each chunk B of data has domain locality, and has domain locality to previous and following chunks. In some embodiments, this can be accomplished by tiling the data into 8-dimensional chunks ($S_0$_o, $S_1$_o, $S_2$_o, k_o, $S_0$_i, $S_1$_i, $S_2$_i, k_i) where $S_0$_i*$S_1$_i*$S_2$_i*k_i=B, and $S_n$_o*$S_n$_i=$S_n$ for each n in [0, 1, 2] and k_o*k_i=k, where i and o indices stand for inner and outer respectively in relation to blocking of the domain dimensions (e.g., inner and outer loops for partitioning the domain). For example, in some embodiments, the data of the domain is tiled such that each point processor receives node data corresponding to a portion of the values of a domain datapoint at a time (e.g., k_i values out of a total k values for the datapoint).

In some embodiments, a three-dimensional computational array (A0, A1, A2) may allow scheduling of computational blocks in 3 dimensions+time (A0, A1, A2, t) and k=1 causing the computed output block to be ($S_0$_i, $S_1$_i, $S_2$_i) and the computational space to be ($S_0$_i, $S_1$_i, $S_2$_i, $C_i$). In some embodiments, the assignment ($S_0$_i, $S_1$_i, $S_2$_i, $C_i$)-> (A0, A1, t, A2) is used, where the computation dimension is spatial (e.g., along the A2 dimension), and the domain is iterated over time in the $S_2$ dimension. In every cycle, ($S_0$_i, $S_1$_i, 1) input values are loaded onto the (A0, A1, 0) slice of the array (e.g., corresponding to the first tile of A0×A1 point processors of the array). In some embodiments, $S_0$_i<=A0 and $S_1$_i<=A1, in order to accommodate additional surrounding datapoints needed to calculate next values of the input data, based on the stencil size $n_0 \times n_2$.

In some embodiments, because of data dependencies across chunks with domain localities, caching may be used to store this data locally on chip without having to go back to main memory (e.g., on chip memory cache 504 illustrated in FIG. 5). In some embodiments, the cached data may correspond to data those at the boundaries of the ($S_0$_i, $S_1$_i, $S_2$_i, k_i) block, based off the size of the stencil ($n_0$, $n_1$, $n_2$), and includes:

S2 Boundary: A block of size roughly ($S_0$_i*$S_1$_i*$n_2$*k_i) is cached every cycle to be used k_o cycles later S1 Boundary: A block of size ~($S_0$_i*n1*$S_2$_i*k_i) is cached every cycle to be used $S_2$_o*k_o cycles later S0 Boundary: A block of size ~(n0*$S_1$_i*$S_2$_i*k_i) is cached every cycle to be used $S_1$_o*$S_2$_o*k_o cycles later.

Due to caching, every cycle the computational array receives an input block of size ($S_0$_i+n0, $S_1$_i+n1, $S_2$_i+n2, k_i), and will compute an output block of size ($S_0$_i, $S_1$_i, $S_2$_i, k_i) (assuming an Initiation Interval of 1, but with some latency). The decision about how to schedule the $S_0$_i*$S_1$_i*$S_2$_i data on the 3+dimensional architecture affects the structure of the architecture.

Scheduling and Point Processor Configuration

Because each point processor, during solving, runs the same algorithm but on different data, the compiler can target just a single point processor and have a single set of instructions for all the point processors. Due to the parallelism of the domain and architecture, there can be a static configuration for all the point processors with one instruction per point processor and each instruction specifying ALU operations of the point processor, source of ALU inputs from router of the point processor, and Source/Destination of neighboring connection to/from the router. This configuration needs to be loaded just once per program.

The goal of the compiler is to, given a particular partial differential equation (or similar problem) that will be applied to all points on a 1, 2 or 3 dimensional grid, determine how to configure the computational array to compute the equation. For ease of discussion, operations of the compiler are discussed in relation to the non-linear convection equation below:

$$\frac{\delta u}{\delta t} + u \frac{\delta u}{\delta x} = 0 \qquad (2)$$

In some embodiments, the compiler translates the partial differential equation into an intermediate equation, e.g., a discretized form of the partial differential equation. For example, the partial differential equation of Equation (2) above can be translated into the discretized form shown below in Equation (3), which defines how a node value for a next time step $u_i^{n+1}$ is determined based on the value of node $u_i^n$ of a current time step, and any nearby nodes, e.g., stencil inputs, of the domain (e.g., $e_{i-1}^n$):

$$u_i^{n+1} = u_i^n - u_i^n \frac{\Delta t}{\Delta x}(u_i^n - u_{i-1}^n) \qquad (3)$$

Figure 9:
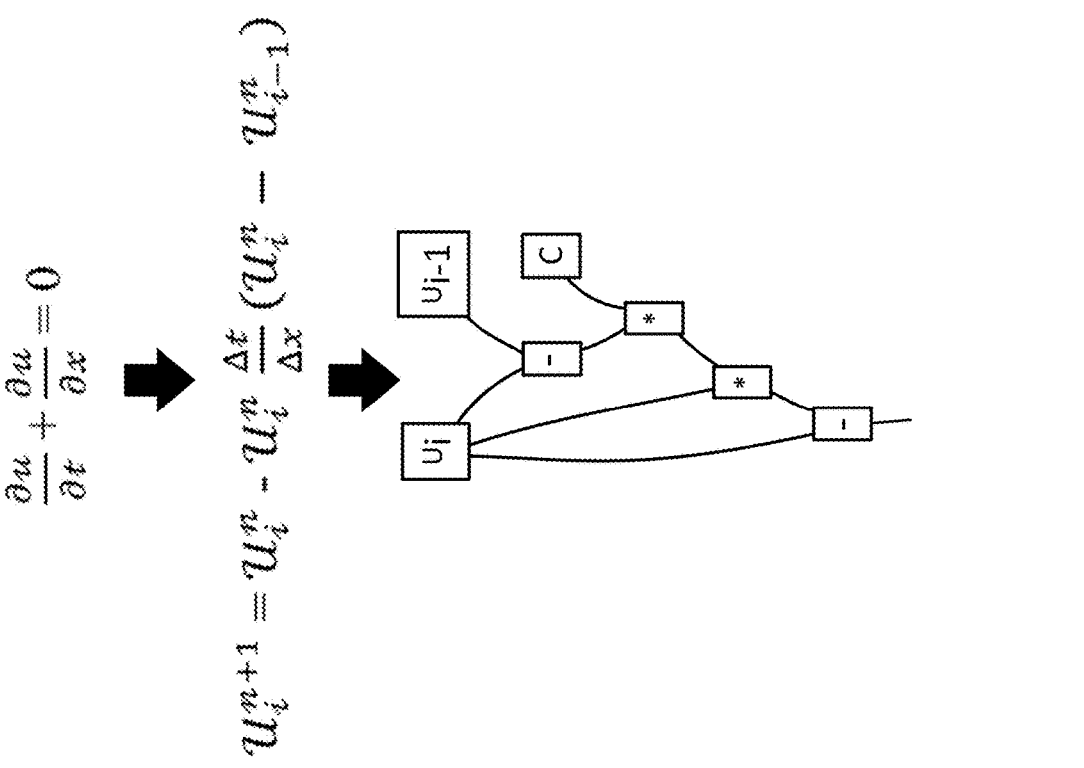
FIG. 9 illustrates an example of a discretized equation represented as a DAG, in accordance with some embodiments.

FIG. 9 illustrates an example of a discretized equation represented as a DAG, in accordance with some embodiments. The discretized equation indicates the stencil inputs for a node with some 3d offset, constant values, and basic operations. The DAG of FIG. 9 outputs the next finite difference time step, where standard optimizations can be performed to minimize the number of nodes. As shown in FIG. 9, the basic operations of the discretized equation may be expressed as arithmetic operations (e.g., addition/subtraction and multiplication), and the parameter $$\frac{\Delta t}{\Delta x}$$

may be expresses as a constant C.

Figure 10:
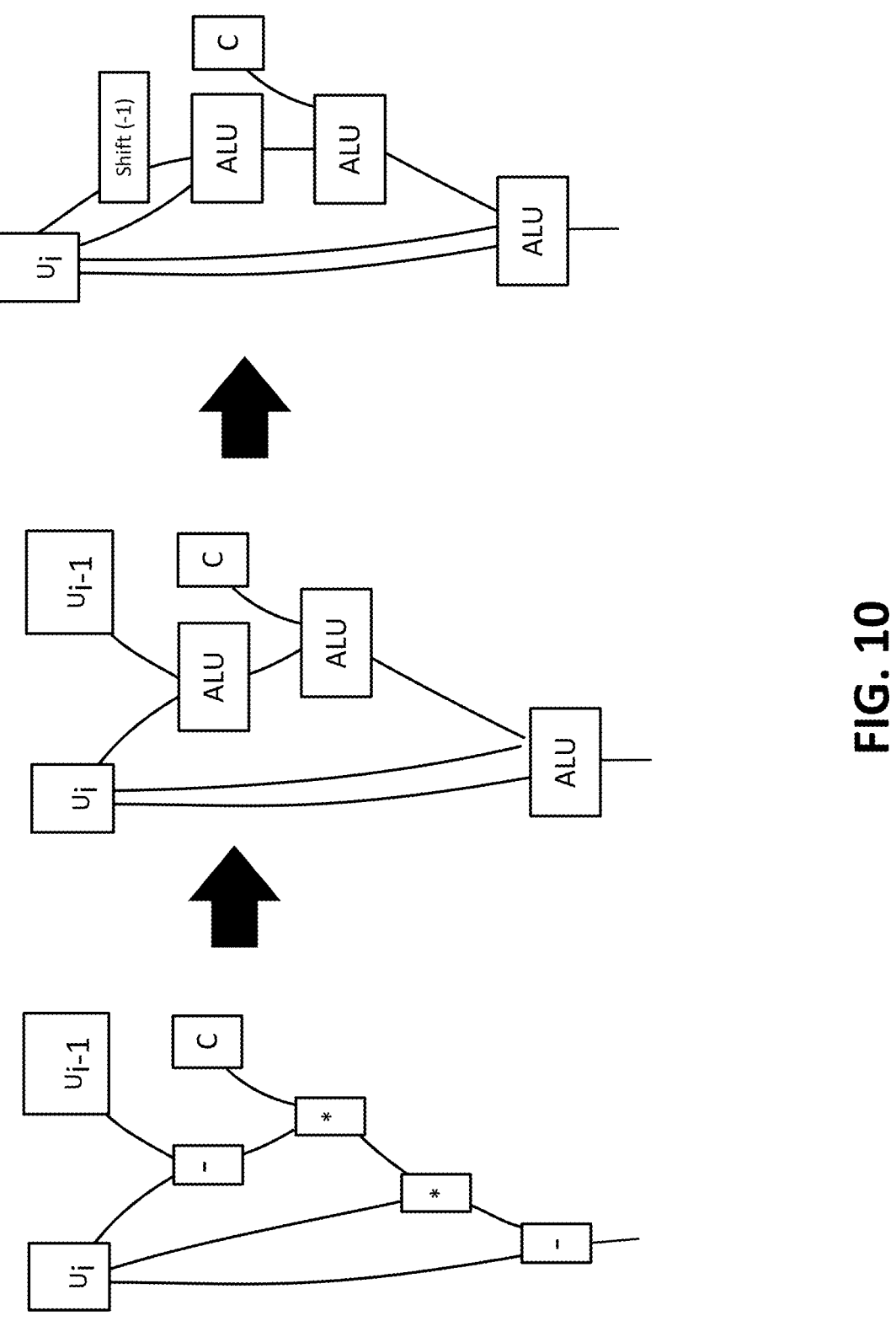
FIG. 10 is a diagram showing how the compiler maps the DAG of FIG. 9 to instructions, in accordance with some embodiments.

FIG. 10 is a diagram showing how the compiler maps the DAG of FIG. 9 to instructions, in accordance with some embodiments. The compiler translates the discretized equation into ALU operations with the goal to minimize the number of ALU nodes. For example, in some embodiments, multiple arithmetic operations (e.g., a multiply and subtract) may be fused and performed at a single ALU. In some embodiments, adjacent operations involving a common term (e.g., as shown in FIG. 10, a multiplication of a current value by followed by a subtraction by the same term $u_i$) are combined into a single ALU operation, reducing an amount of data needed to be routed to the tiles of the point processors. In addition, data offsets (e.g., data dependency on other nodes of the domain) are replaced with a shift node parametrized by a 3d offset. In some embodiments, shift nodes are interpreted as a connection to and from the associated neighboring tile's value.

In some embodiments, the compiler determines placement in two separate steps. First, the compiler determines processor assignment, in which each ALU and output is assigned a process ID where the process ID is specified as a 3D offset. Next, each ALU and output is assigned a processor offset to minimize the total amount of shifts. For example, the process IDs may be assigned such that neighboring nodes of the domain are mapped to architecturally neighboring point processors of the point processor array.

Second, the compiler performs tile assignment, which assigns each ALU and each shift to a tile ID of a point processor while minimizing routing contention, and in consideration of constraints such as ALU distance, dependency between ALUs, pipeline latency, and shift distance. FIG. 11 is a diagram showing how the compiler maps the instructions shown in FIG. 10 to tiles of a point processor, in accordance with some embodiments. For example, as shown in FIG. 11, each ALU operation is mapped to a respective tile of a point processor (e.g., tiles T0, T1, T2, etc.). In addition, each shift node and constant value is mapped to a respective tile configured to receive a value of the shift node or constant value for performing its respective ALU operation.

FIG. 12 is a diagram showing how the compiler performs routing between point processors of the computational array, in accordance with some embodiments. In some embodiments, the compiler assigns a routing ID to all of the inputs/outputs and neighbor connections to each ALU. For example, the discretized form shown in Equation (3) above indicates that the next time step value of a node is based on a value of a nearby node. As shown in FIG. 12, the compiler converts each shift into a first routing to receive a value from a tile of a first neighboring point processor, and a second routing to provide a value to a tile of a second neighboring point processor. The compiler may allocate each movement of data to a particular routing lane connecting the tiles of the point processors. For example, as discussed above, in some embodiments, the tiles of a point processor may be routed such that a tile $T_i$ may receive data directly from a tile $T_{i-2}$ of the same point processor. As such, as shown in FIG. 12, the compiler may configure the point processor such that the tile T2 receives the original node data value $u_t$ routed from tile T0. In other embodiments, the data may be routed differently through the tiles (e.g., based upon a number of tiles needed to be traversed). The compiler further assembles the tile information for each tile into a bit vector instruction (i.e., ALU operations and routing IDs) for a point processor, and creates the global constants (e.g., $$C = \frac{\Delta t}{\Delta x}).$$

In some embodiments, the global constants are populated to one or more registers at respective tiles (e.g., C stored at T1, as illustrated in FIG. 12) during assembly, while in other embodiments, the constants may be passed to the tiles from memory during runtime (e.g., via the routings between the tiles of the point processor).

Because all the data and computational requirements are known at compile time, and thus, there need not be any dynamic scheduling during runtime on the architecture (which, in GPUs and CPUs, may require a sizable percentage of chip area in the form of circuitry for coordinating dynamic program behavior). Because the point processors 508 do not need to perform any dynamic scheduling, each problem can be statically scheduled on the architecture at compile time, allowing for a greater proportion of on-chip area to be allocated towards useful computation, turning memory bandwidth bound problems into memory compute bound ones.

FIG. 13 is a flowchart of a process for generating a point processor configuration for solving a partial differential equation problem package, in accordance with some embodiments. In some embodiments, the operations of the process are performed by a compiler. The compiler receives 1302 a partial differential equation, and determines 1304 a discretized form of the partial differential equation.

The compiler determines 1306 a set of arithmetic operations to compute the discretized form of the partial differential equation. In some embodiments, the compiler maps the arithmetic operations to ALUs, in which at least two of the arithmetic operations are fused to be performed by the same ALU.

The compiler determines 1308 neighbor routing connections corresponding to node values in the discretized form of the partial differential equation. In some embodiments, the compiler converts each stencil inputs corresponding to nearby nodes indicated in the discretized equation into shift nodes, and generates, for each shift node, neighbor routing information specifying a first connection for a tile of a point processor to receive a value from an adjacent point processor, and a second connection for a tile of the point processor to provide a value to another adjacent point processor.

The compiler generates 1310 a point processor configuration based upon the determined set of arithmetic operations and set of neighbor routing connections. The point processor configuration may correspond to a bit vector instruction indicating ALU operations and routing IDs for the tiles of the point processor.

Figure 14:
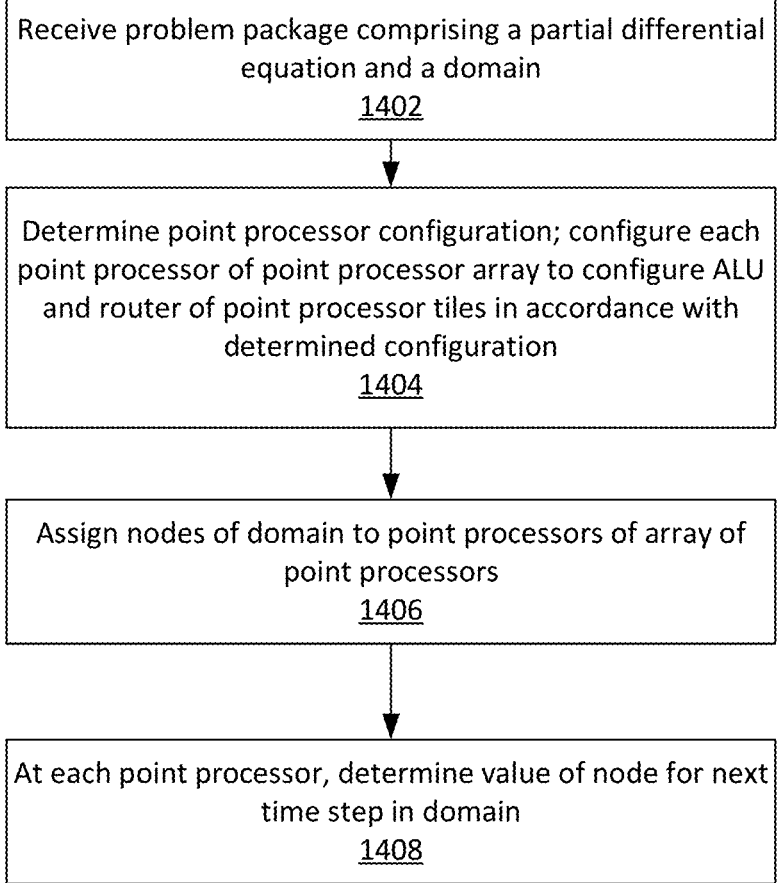
FIG. 14 is a flowchart of a process for solving a partial differential equation using an array of point processors, in accordance with some embodiments.

FIG. 14 is a flowchart of a process for solving a partial differential equation using an array of point processors, in accordance with some embodiments. In some embodiments, the operations of the process are performed by a processing element of a DEA (e.g., the processing element 406). The processing element receives 1402 information associated with a problem package, the problem package comprising a partial differential equation and a domain.

The processing element determines 1404 a point processor configuration associated with the problem package, and configures each point processor of a point processor array to configure the ALU and router of the point processor tiles, in accordance with determined configuration. In some embodiments, the configuration may correspond to a configuration generated by a compiler (using the process illustrated in FIG. 13) based on the type of partial differential equation associated with the problem package.

The processing element assigns 1406 nodes of the domain of the problem package to the array of point processors. For example, where the processing element includes an A0×A1 array of point processors, the domain of the problem package may be divided into sections of A0×A1 nodes to be passed through the array of point processors.

The processing element determines 1408, at each point processor, a value of node for next time step in the domain. For example, a first tile of each point processor may receive data corresponding to a node of the domain to be processed. The node data is passed through a plurality of tiles, which perform successive ALU operations on the node data, which may include at least one ALU operation using data from a nearby point processor corresponding to another node of the domain (e.g., as specified by the stencil for the tile). Steps 1406 and 1408 may be repeated until node data for a desired number of time steps has been computed.

In some embodiments, the above-described architecture is able to utilize the full off-chip memory bandwidth every clock cycle to load new data and store fully-computed data. Data from each point of the domain is only loaded once from off-chip, and partial results of a computation should remain on chip. Because scheduling is performed at the compiler, there is no need for dynamic scheduling, allowing for most of the chip area to be used "compute" so that only programs where (computational intensity*memory bandwidth >chip's compute capacity) will be compute-bound. The chip's compute will be comprised of a large set of simple parallel computational units (point processors). Architecturally neighboring point processors are assigned to perform neighboring computations in the domain to facilitate stencil-based and computational data dependencies, and to reduce on-chip data movement to minimize power consumption.

In some embodiments, each tile or block on the systolic array performs a limited number of potential operations across all different forms of PDEs that are use cases, e.g., either a logic operation, a calculation, or a passthrough. These operations can easily be performed on a simple arithmetic and logic unit (ALU) whilst values from adjacent cells required for the computation can be transmitted or received via a router. As such, each point processor of the array of point processors may be constructed as a plurality of sequentially arranged tiles, each having a router and ALU, and configurable to exchange data with tiles of nearby point processors. Each point processor performs the same set of operations during solving of the problem package, allowing for the compiler to generate an instruction for one point processor that can be applied to all point processors of the array.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A system, comprising:
a memory configured to store a plurality of nodes of a domain corresponding to a first time-step, the nodes associated with a partial differential equation having a discretized form;
an array of configurable point processors, each point processor comprising a linear arrangement of tiles, wherein each tile comprises:
an arithmetic logic unit (ALU) configurable to perform one or more arithmetic operations on a node value received by the tile; and
a router configurable to communicate with at least one neighboring tile of the same point processor or a different point processor of the array;
a controller configured to process the domain using the array of point processors, wherein each point processor of the array of point processors receives a respective node of the domain, and processes the received node data to generate node data for a next time step of the domain.

2. The system of claim 1, wherein the controller is configured to configure the array of configurable point processors based upon the discretized form of the partial differential equation.

3. The system of claim 1, wherein the controller is configured to:
receive a point processor configuration for configuring a point processor of the array of point processors, comprising:
a set of arithmetic operations for computing the discretized form of the partial differential equation mapped to tiles of the point processor;
a set of neighbor routings for one or more tiles of the point processor generated based upon node values within the discretized form of the partial differential equation;
apply the point processor configuration to each point processor of the array of point processors to configure the tiles of each point processor in accordance with the determined set of arithmetic operations and set of neighbor routings.

4. The system of claim 3, wherein the controller applying the point processor configuration to a point processor of the array of point processors comprises:
mapping each of the set of arithmetic operations to a respective tile of the point processor;
mapping each of the set of neighbor routings to a respective tile of the point processor by establishing, for the respective tile, a first routing to receive a value from a tile of a first neighboring point processor, and a second routing to provide a value to a tile of a second neighboring point processor.

5. The system of claim 3, wherein the point processor configuration is generated by a compiler configured to:
determine an initial set of arithmetic operations, each corresponding to a respective operation of the discretized form of the partial differential equation;
identify two or more arithmetic operations performed on a common term; and
combine the two or more arithmetic operations to be performed by a same ALU of a single tile.

6. The system of claim 1, wherein a configuration of each point processor of the array of point processors corresponds to a computational direct acyclic graph (DAG) configured to process of the node of the domain to generate node data for a next time step based upon the discretized form of the partial differential equation.

7. The system of claim 1, wherein the point processors of the array of point processors are configured to process received node data in parallel.

8. The system of claim 1, wherein a router of a tile of a point processor of the array of configurable point processors is configured to receive an output of a first tile corresponding to an adjacent previous tile of the linear arrangement of tiles of the point processor, and an additional output of a second tile corresponding to an adjacent previous tile of the first tile in the point processor or a tile corresponding to the first tile of an adjacent point processor of the array.

9. The system of claim 1, wherein the router of each tile comprises one or more registers configurable to store a constant value based upon the discretized form of the partial differential equation.

10. The system of claim 1, wherein the plurality of nodes stored by the memory comprises a block of nodes to be processed by the point processors of the array of point processors, and a plurality of additional nodes of the domain outside a boundary of the block of nodes, the plurality of additional nodes selected based upon one or more data dependencies of a tile of a point processor of the array of point processors.

11. The system of claim 1, wherein the point processors of the array of point processors are configured to process a new set of nodes at a first tile of each point processor during each clock cycle over a plurality of clock cycles, and to pass processed node data through a plurality of tiles of the respective linear arrangements of tiles over a plurality of subsequent clock cycles.

12. The system of claim 1, wherein the linear arrangement of tiles of a point processor of the array of point processors is pipelined such that a plurality of tiles of the linear arrangement are each configured to route respective output values to another tile of the point processor P tiles away, where P>1.

13. A method, comprising:
storing, in a memory, a plurality of nodes of a domain corresponding to a first time-step, the nodes associated with a partial differential equation having a discretized form;
configuring an array of configurable point processors based upon the partial differential equation, wherein each point processor comprises a linear arrangement of tiles, and each tile comprises:
an arithmetic logic unit (ALU) configurable to perform one or more arithmetic operations on a node value received by the tile; and
a router configurable to communicate with at least one neighboring tile of the same point processor or a different point processor of the array;
processing the domain using the array of configurable point processors, wherein each point processor of the array of point processors receives a respective node of the domain, and processes the received node data to generate node data for next time step of the domain.

14. The method of claim 13, wherein the array of configurable point processors is configured based upon the discretized form of the partial differential equation.

15. The method of claim 13, further comprising:
receiving a point processor configuration for configuring a point processor of the array of point processors, comprising:

a set of arithmetic operations for computing the discretized form of the partial differential equation mapped to tiles of the point processor;

a set of neighbor routings for one or more tiles of the point processor generated based upon node values within the discretized form of the partial differential equation;

configuring the array of configurable point processors by applying the point processor configuration to each point processor of the array of point processors to configure the tiles of each point processor in accordance with the determined set of arithmetic operations and set of neighbor routings.

16. The method of claim 15, wherein applying the point processor configuration to a point processor of the array of point processors comprises:

mapping each of the set of arithmetic operations to a respective tile of the point processor;

mapping each of the set of neighbor routings to a respective tile of the point processor by establishing, for the respective tile, a first routing to receive a value from a tile of a first neighboring point processor, and a second routing to provide a value to a tile of a second neighboring point processor.

17. The method of claim 13, wherein a configuration of each point processor of the array of point processors corresponds to a computational direct acyclic graph (DAG) configured to process of the node of the domain to generate node data for a next time step based upon the discretized form of the partial differential equation.

18. The method of claim 13, wherein the point processors of the array of point processors process received node data in parallel.

19. The method of claim 13, wherein the router of each tile comprises one or more registers configurable to store a constant value based upon the discretized form of the partial differential equation.

20. The method of claim 13, wherein the plurality of nodes stored by the memory comprises a block of nodes to be processed by the point processors of the array of point processors, and a plurality of additional nodes of the domain outside a boundary of the block of nodes, the plurality of additional nodes selected based upon one or more data dependencies of a tile of a point processor of the array of point processors.

* * * * *